United States Patent [19]
Kitano et al.

[11] Patent Number: 5,895,598
[45] Date of Patent: Apr. 20, 1999

[54] ROLLER APPARATUS WITH MAGNETIC INDUCTION HEATING ARRANGEMENT

[75] Inventors: Yoshio Kitano; Kozo Okamoto, both of Kyoto, Japan

[73] Assignee: Tokuden Co., Ltd., Kyoto, Japan

[21] Appl. No.: 08/939,089

[22] Filed: Sep. 26, 1997

[30] Foreign Application Priority Data

Oct. 16, 1996 [JP] Japan .................. 8-309850

[51] Int. Cl.$^6$ ............................. H05B 6/14
[52] U.S. Cl. ............ 219/619; 219/672; 219/676; 219/469; 100/92; 492/46
[58] Field of Search .................. 219/619, 618, 219/672, 676, 469, 470, 471, 652; 100/92, 301, 328, 333, 335; 492/46

[56] References Cited

U.S. PATENT DOCUMENTS

| | | | |
|---|---|---|---|
| 5,074,019 | 12/1991 | Link | 29/116.2 |
| 5,553,729 | 9/1996 | Kitano et al. | 219/619 |

FOREIGN PATENT DOCUMENTS

| | | | |
|---|---|---|---|
| 2-12791 | 1/1990 | Japan | 219/619 |
| 4-306588 | 10/1992 | Japan | 219/619 |
| 6-267650 | 9/1994 | Japan | 219/619 |

Primary Examiner—Philip H. Leung
Attorney, Agent, or Firm—Morgan, Lewis & Bockius LLP

[57] ABSTRACT

An induction heating roller apparatus comprises:

a stationary shaft 23 having a plurality of hydraulic operating mechanisms 27 arranging in one line in the direction of axis, each hydraulic operating mechanism being made up of a cylinder 25 and a piston 26, and magnetic flux generating mechanisms 32 and 35 which comprise iron cores 30 and 33 and induction coils 31 and 34 wound on the latter 30 and 33; and a roller 21 which is rotatably supported on the stationary shaft 23, and has a cylindrical wall which includes jacket chambers 22 filled with a two-phase (gas and liquid) heating medium. In the apparatus, the magnetic flux generating mechanisms 32 and 35 being arranged on both sides of the stationary shaft in the direction of axis in such a manner that they are circumferentially 90° away from the hydraulic operating mechanisms arranged in one line. Therefore, it is possible to provide an induction heating roller apparatus which is able to more accurately amend the configuration of the roller according to the amount of deflection, to make the surface temperature of the roller more uniform, and to perform thermal conversion with high efficiency.

16 Claims, 5 Drawing Sheets

ROLLER APPARATUS WITH MAGNETIC INDUCTION HEATING ARRANGEMENT

BACKGROUND OF THE INVENTION

This invention relates to an induction heating roller apparatus.

It is well known in the art that, in the case where sheet material such as plastic, paper, cloth, nonwoven cloth, and thin metal plate, or web material (hereinafter referred to merely as "a product", when applicable) is continuously hot-rolled, a pair of hot rollers called "hot calendar rollers, emboss rollers, or thermal bonding rollers" are used, or one hot roller and an elastic roller abutted against the hot roller are used to nip the sheet or web between those rollers.

In the operation thereof, it is required to uniformly apply a predetermined nip pressure to the sheet or web, and to uniformly heat it. In order to meet this requirement, the accuracy in heating temperature distribution in the axial direction of the roller, and the bending of the rollers by their own weight must be taken into account mainly. If it is assumed that a hot calendar roller having the outer diameter of 500 mm has a surface temperature difference of 10° C., then the diameter has a thermal expansion difference of the order of 0.05 mm. That is, when the heating operation and the pressurizing operation are not uniform, there is a possibility that the quality of the resultant product is adversely affected. Hence, the surface temperature of the roller must be uniform in the direction of axis.

When a load is applied to the product to pressurize the product, the roller is bent by the load. The rotational axis of the roller thus bent is arcuate as viewed from the outside. As a result, especially near the middle of the roller in the direction of axis, a gap is formed between the pair of rollers. In this case, as well as the above-mentioned operation, the heating operation and the pressurizing operation are not uniform, so that there is a possibility that the quality of the resultant product is adversary affected. Hence, it is essential to prevent the roller from being bent by the load.

In a hot roller of this type, the above-described requirement is conventionally satisfied in such a manner that hot oil is utilized as its thermal source, and that so-called "crown roller" the middle portion of which is made arcuate so that it is larger than the end portions in correspondence to the amount of deflection is provided, or a means for applying an oil pressure to the inner cylindrical surface of the roller to amend the deflection is provided.

On the other hand, attention has been paid to an induction heating roller apparatus as the heating roller of this type which can be put in the production line because of its characteristics, quick heating, high-temperature heating, and contact-less heating. The induction heating roller apparatus in which the deflection of the roller generated by the load is amended, is disclosed in the Japanese Patent Unexamined Publication No. 12791/1990.

The induction heating roller apparatus thus disclosed will be briefly described with reference to a longitudinal sectional view of FIG. 1, and a cross sectional view of FIG. 2. A stationary shaft 2 is fixedly set on a stand 1, and a plurality of magnetic flux generating mechanisms 5 are mounted on the stationary shaft 2 at predetermined intervals in the direction of axis. Each of the magnetic flux generating mechanisms 5 comprises iron core 3 and induction coils 4. Hydraulic operating mechanisms 8 are respectively provided between the adjacent magnetic flux generating mechanisms 5 in the direction of axis. Each of the hydraulic operating mechanisms 8 comprises a piston 6 which is moved by oil pressure in the radial direction of the stationary shaft 2, and a cylinder 7 in which the piston 6 is inserted.

In addition, a roller 9 is rotatably supported on the stationary shaft 2. The roller 9 has jacket chambers 10 in its cylindrical wall in which two-phase (gas and liquid) heating medium is sealingly filled.

Since the induction heating roller apparatus is constructed as described above, when AC current is applied to the induction coils 4 of the magnetic flux generating mechanisms 5, alternating magnetic flux outputs are produced in magnetic circuits which are made up of the iron cores 3 of the magnetic flux generating mechanisms 5 and the cylindrical wall of the roller. Those alternating magnetic flux outputs go across the inner cylindrical wall of the roller 9, so that induction currents are generated therein. The Joule heat of the induction currents heats the inner cylindrical wall of the roller 9. In this operation, the two-phase (gas and liquid) heating medium in the jacket chambers 10 formed in the cylindrical wall of the roller 9 perform latent heat transfer, so that the surface temperature distribution of the roller 9 in the direction of axis is uniform.

In the hydraulic operating mechanisms 8, pressurized oil is supplied to the cylinders 7 through an oil path 13 formed in the stationary shaft 2, so that the pistons 6 are pushed towards the inner cylindrical wall of the roller 9, thereby to amend the deflection of the roller 9.

On the other hand, since the roller 9 rotates while the cylindrical wall of the roller 9 are being pushed by the pistons 6, an inner race 11 and rolling elements 12 such as rollers are provided between the end of each piston 6 and the inner cylindrical wall of the roller in order not to obstruct the rotation of the roller. That is, it is possible that the piston 6 is pushed against the inner race 11 to amend the deflection of the roller.

The conventional induction heating roller apparatus thus constructed is advantageous in that the temperature distribution of the roller in the direction of axis is uniform, and the deflection of the roller by the load applied thereto can be amended in the above-described manner.

However, it is still disadvantageous in the following points:

The arrangement of the hydraulic operating mechanisms is limited in density because the hydraulic operating mechanisms are arranged in the direction of axis between the magnetic flux generating mechanisms which are finely divided in the direction of axis. Accordingly, it is difficult to delicately amend the deflection of the roller. In addition, there is a fear of being adversely affected by the variation in diameter of the roller which is caused by "thermal crown" between the adjacent magnetic flux generating mechanisms, because the distance between adjacent magnetic flux generating mechanisms is relatively long. Moreover, the current allowed to flow in the induction coils is limited with respect to the size of the roller, so that it is impossible to increase the temperature of the roller, and to supply more thermal energy to the roller.

SUMMARY OF THE INVENTION

It is an object of the present invention to provide an induction heating roller apparatus which is able to more accurately amend the configuration of the roller according to the amount of deflection, to make the surface temperature of the roller more uniform, and to perform thermal conversion with high efficiency.

The foregoing object of the invention has been achieved by the provision of an induction heating roller apparatus comprises:

a stationary shaft having a plurality of hydraulic operating mechanisms which are arranged in one line extending in parallel with the axial direction of the stationary shaft, and also having magnetic flux generating mechanisms which respectively comprise iron cores and induction coils wound on the iron cores, and a roller rotatably supported on the stationary shaft and having a cylindrical wall with at least one jacket chamber which is filled with a two-phase heating medium, wherein each of the hydraulic operating mechanisms include a piston for pressing the inner cylindrical surface of the cylindrical wall by a hydraulic pressure of pressing oil which is supplied to the piston of the hydraulic operating mechanisms, and the roller is heated by application of current to the induction coils of the magnetic flux generating mechanisms, wherein the magnetic flux generating mechanisms are arranged circumferentially away from the one line defined by the hydraulic operating mechanisms.

In the induction heating roller apparatus of the invention, the hydraulic operating mechanisms and the magnetic flux generating mechanisms are arranged in the direction of axis in such a manner that they are circumferentially shifted from one another. Therefore, a plurality of hydraulic operating mechanisms can be arranged along the stationary shaft with high density, and the geometrical moment of inertia in the direction of deflection of the stationary shaft which is due to the reaction of the hydraulic operating mechanisms can be increased, and the load resistance can be increased. Hence, the configuration of the roller can be changed according to the amount of deflection of the roller. Furthermore, even if a magnetic flux generating mechanism is divided into many parts; that is, even if a number of small magnetic flux generating mechanisms are employed, they can be arranged without provision of a large gap between the adjacent magnetic flux generating mechanisms. Hence, the temperature of the surface of the roller can be made uniform.

In the above-mentioned induction heating roller apparatus according to the invention, the stationary shaft (27) further may include a member for supplying a cooling oil to the magnetic flux generating mechanisms.

In this case, the cooling oil is caused to flow in the magnetic flux generating mechanisms to cool the magnetic flux generating mechanisms, so that large current is allowed to flow in the induction coils forming the magnetic flux generating mechanisms. Hence, the temperature of the surface of the roller can be increased, and the temperature follow-up characteristic with respect to a product high in thermal capacity can be increased.

Furthermore, in the above-mentioned induction heating roller apparatus according to the invention, the magnetic flux generating mechanisms may be arranged on both sides of the hydraulic operating mechanisms arranged in one line in such a manner that the magnetic flux generating mechanisms are circumferentially 90° away from the hydraulic operating mechanisms arranged in the one line. Hence, the magnetic flux generating mechanisms can be arranged on both opposite (right and left) sides of the stationary shaft without lowering the geometrical moment of inertia in the direction of deflection of the stationary shaft which is due to the reaction of the hydraulic operating mechanisms. Furthermore, the magnetic flux generating mechanisms are arranged at the positions of right angles where the amount of displacement with respect to the stationary shaft is less which is due to the deflection, and therefore the electromagnetic coupling of the magnetic flux generating mechanisms to the roller is high in stability.

If, in this connection, the plurality of magnetic flux generating mechanisms, which are arranged on both sides of the stationary shaft in the direction of axis, are shifted as much as a half of the length of each magnetic flux generating mechanism in the direction of axis; that is, if the center of the magnetic flux generating mechanisms are arranged in a staggered manner in section taken along with the axial direction of the stationary shaft, the temperature distribution of the rollers in the direction of axis is improved in uniformity, and the effect of the variation in diameter of the roller, which is generated by "thermal crown", is substantially eliminated.

Further, some of iron cores of the magnetic flux generating mechanisms may be commonly converted into a linear iron core. Thereby, the magnetic flux generating mechanisms can be readily assembled, and the mounting of the magnetic flux generating mechanisms thus assembled can be achieved with ease.

Furthermore, in the above-mentioned induction heating roller apparatus according to the invention, the iron cores may be formed by laminating U-shaped magnetic steel plates each having a curved portion and straight portions. In this case, the resultant magnetic flux generating mechanisms are less in core loss.

As is apparent from the above description, the geometrical moment of inertia of the stationary shaft in the direction of deflection which is due to the reaction of the hydraulic operating mechanisms can be increased. Therefore, even in the case of a roller apparatus comprising a plurality of different rollers in such a manner that they are confronted with one another, the roller apparatus of the invention may be employed one of the rollers.

DETAILED DESCRIPTION OF PREFERRED EMBODIMENTS

Preferred embodiments of the invention will be described with reference to FIGS. 3 though 13.

Figure 1:
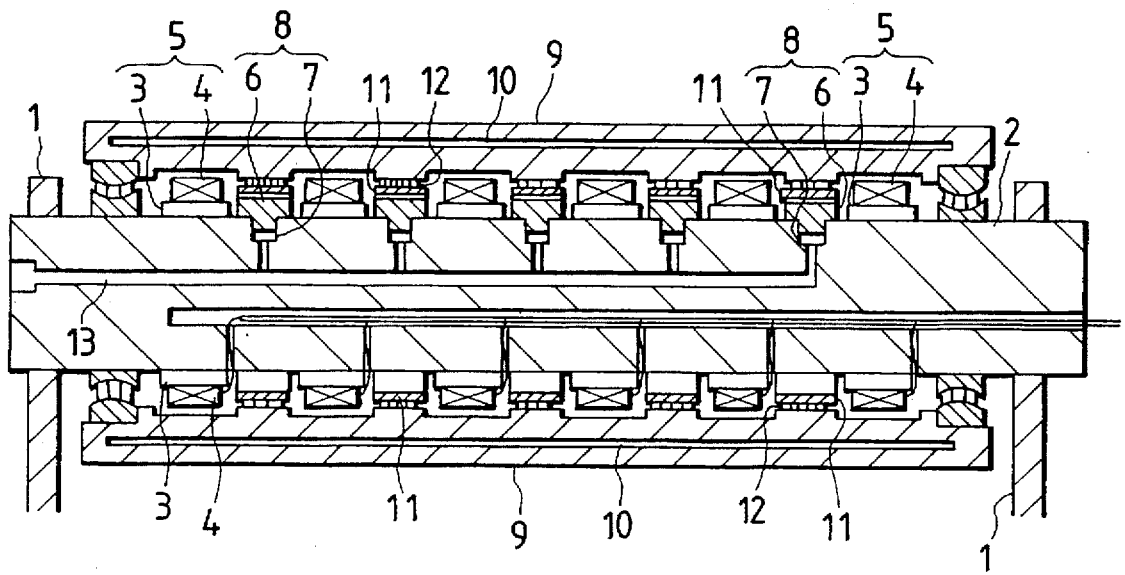
FIG. 1 is a longitudinal sectional view of a conventional induction heating roller apparatus.
Figure 2:
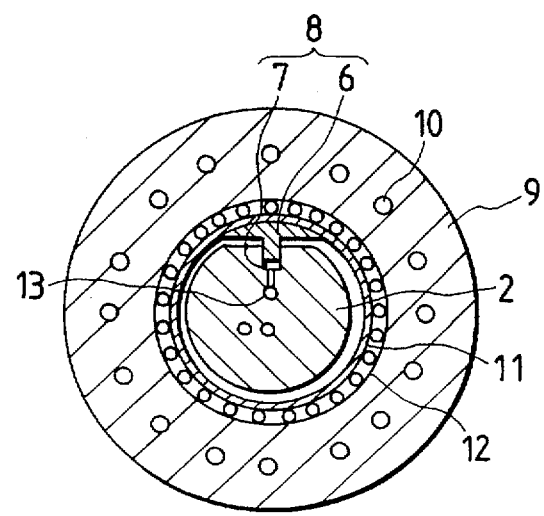
FIG. 2 is a cross sectional view of the conventional induction heating roller apparatus shown in FIG. 1.
Figure 3:
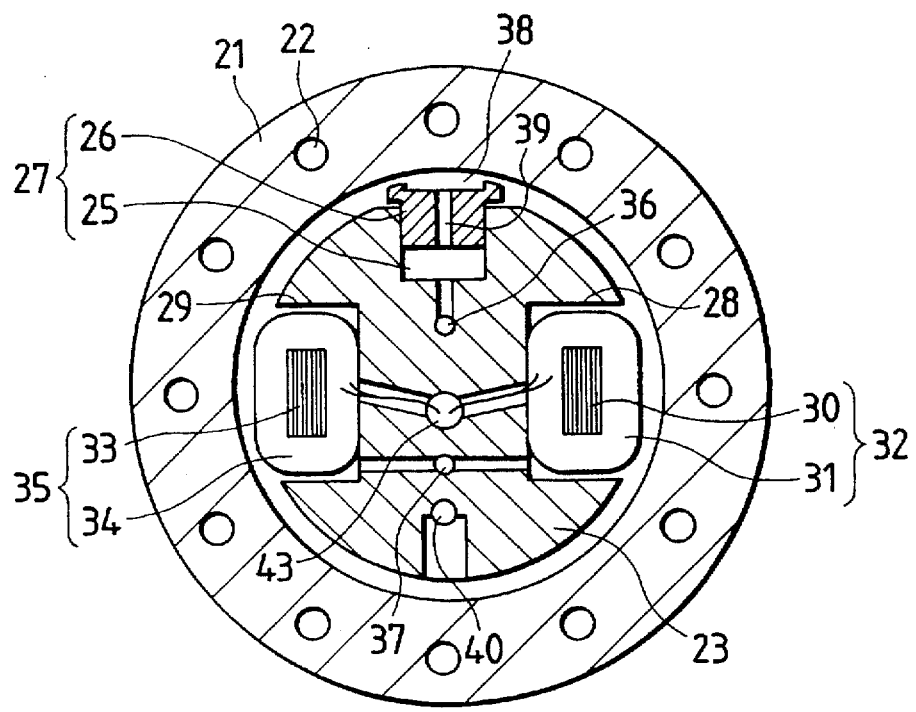
FIG. 3 is a cross sectional view showing the structure of an example of an induction heating roller apparatus according to the invention.
Figure 4:
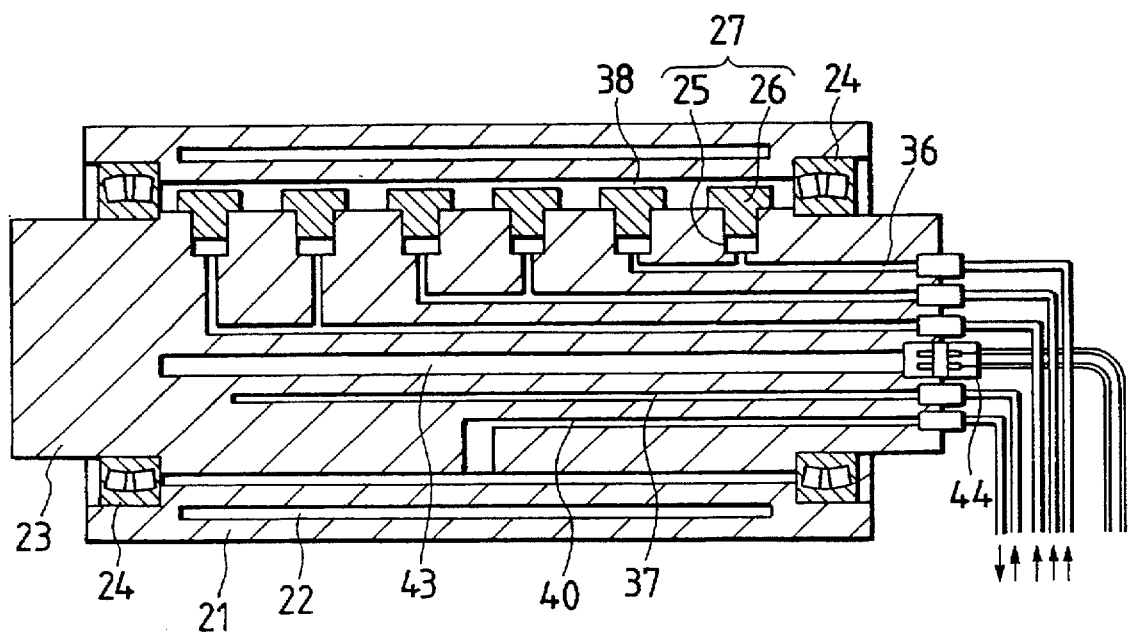
FIG. 4 is a longitudinal sectional view showing the arrangement of hydraulic operating mechanisms of the induction heating roller apparatus shown in FIG. 3.
Figure 5:
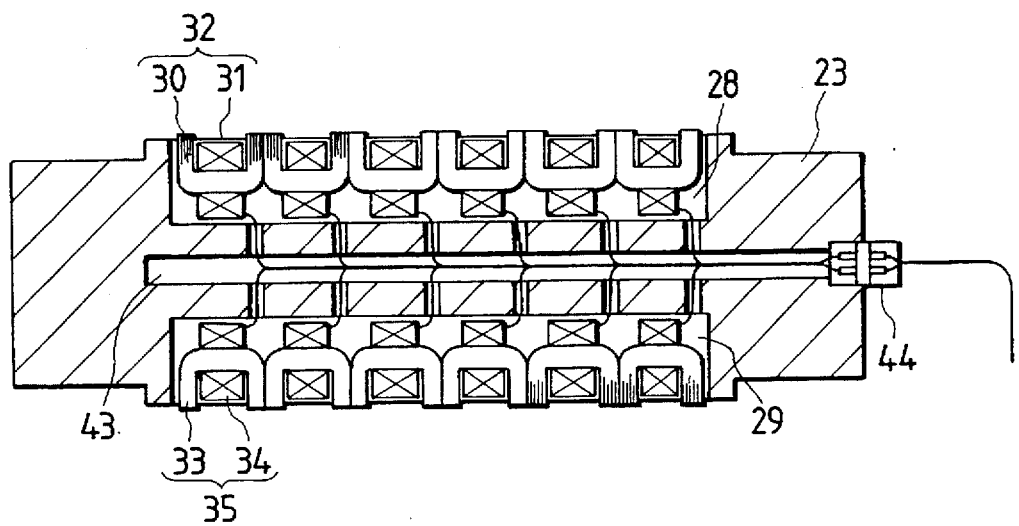
FIG. 5 is a longitudinal sectional view showing the arrangement of magnetic flux generating mechanisms of the induction heating roller apparatus shown in FIG. 3.

FIG. 3 is a cross sectional diagram showing an example of an induction heating roller apparatus according to the invention. FIG. 4 is a longitudinal sectional view showing the arrangement of hydraulic operating mechanisms in the induction heating roller apparatus shown in FIG. 3. FIG. 5 is a longitudinal sectional view showing the arrangement of magnetic flux generating mechanisms in the induction heating roller apparatus shown in FIG. 3.

In FIGS. 3 through 5, reference numeral 21 designates a roller, 22 denotes jacket chambers, and 23 indicates a stationary shaft. The roller 21 is hollow-shaped. The jacket chambers 22 are formed in the cylindrical wall of the roller 21 such that they extend in the axial direction arranged around the central axis at predetermined angular intervals.

A two-phase (ex. gas phase and liquid phase) heating medium such as water is sealingly filled in the jacket chambers 22 by a pressure reduction manner. The roller 21 is rotatably supported on the stationary shaft 23 through self-aligning roll bearings 24. One end portion (the left end portion in FIG. 4) of the roller 21 is coupled with a rotating drive mechanism (not shown).

The stationary shaft 23 has a plurality of hydraulic operating mechanisms 27 (six hydraulic operating mechanisms 27 are shown in FIG. 4) which are arranged in a line parallel with the direction of axis. Each of the hydraulic operating mechanisms 27 comprises a cylinder 25 and a piston 26 which is inserted into the cylinder 25. As shown in FIG. 4, the stationary shaft 23 is provided with recesses 28 and 29 on both (right and left) sides of the hydraulic operating mechanisms 27 which are respectively arranged in a line parallel with the direction of axis, in such a manner that each of the recesses 28 and 29 is circumferentially spaced 90° away from the line defined by the hydraulic operating mechanism 27. Magnetic flux generating mechanisms 32 and 35 are arranged in those recesses 28 and 29, respectively. Each of the magnetic flux generating mechanisms 32 comprises an iron core 30 and an induction coil 31 which is wound on the iron core 30. Similarly, each of the magnetic flux generating mechanisms 35 comprises an iron core 33 and an induction coil 34 which is wound on the iron core 33.

The stationary shaft 23 is further provided with long holes 36 extending in the axial direction through which oil for driving hydraulic operating mechanisms 27 is supplied to the cylinders 25, a long hole 37 extending in the axial direction through which induction coil cooling oil is supplied to the recesses 28 and 29, a long hole 40 extending the axial direction through which the induction coil cooling oil thus supplied is discharged from the space between the stationary shaft 23 and the roller 21, and a long hole 43 extending in the axial direction into which the lead wires of the induction coils 31 and 34 are inserted and accommodated. In this embodiment, the stationary shaft 23 is also provided with a plurality of long holes 36 extending in the axial direction. Each of the long holes 36 is communicated with two cylinders 25.

However, note that the number of long holes 36, and the number of cylinders 25 with which each long hole 36 is communicated, are not limited. They may be suitably determined as the case may be.

Provided on the end portion of each of the pistons 26, which confronts with the inner cylindrical surface of the roller 21 is a pushing portion 38. The pushing portion 38 is made in the form of a shallow dish so as to hold and reserve the oil for pushing the inner cylindrical surface of the roller 21. Each of the pistons 26 has a through-hole 39 which allows to communicate a chamber within the cylinder 25 with the pushing portion 38 of the piston 26.

Figure 9:
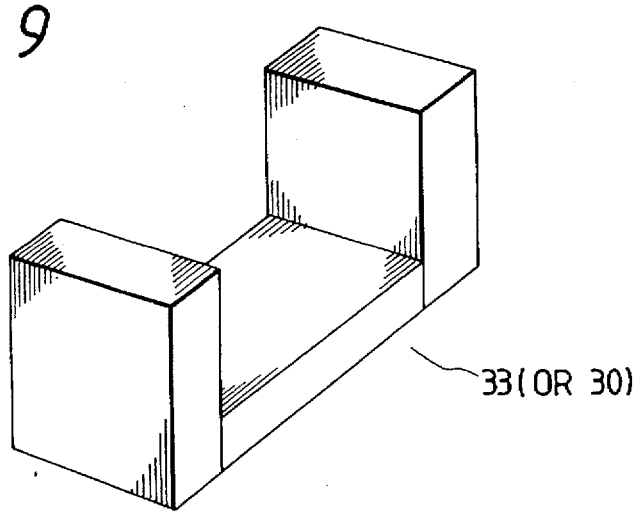
FIGS. 9 and 10 are perspective views showing examples of an iron core in the induction heating roller apparatus according to the invention.
Figure 10:
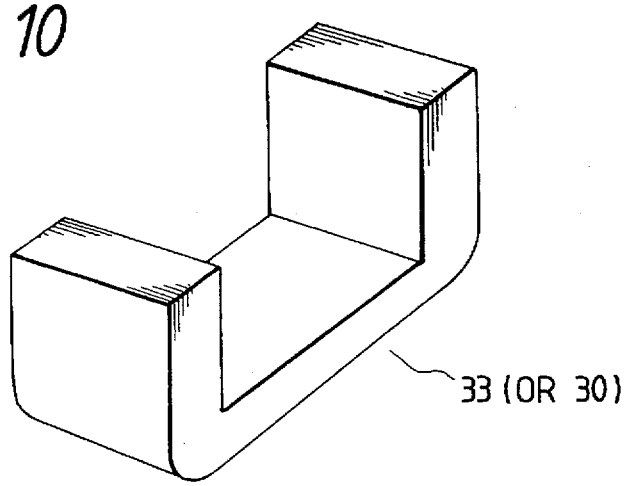

Each of the magnetic flux generating mechanisms 32 and 35 are formed as follows: At first a plurality of magnetic steel plates are stacked and combined to form a primary iron core, and then three pieces of the primary iron cores thus are assembled into the U-shaped in section so as to form a U-shaped iron core 33 or 30 as shown In FIG. 9. Alternatively, at first a magnetic steel plate is wound into a roll-shape in section to form a primary iron core, and the roll-shaped primary iron core is deformed into a substantially rectangle-shape in section. Finally, the iron cores 30 or 33 thus deformed into the rectangle-shape is cut and divided into two pieces so as to form a U-shaped iron core 33 or 30 as shown in FIG. 10. In addition, induction coils 31 and 34 are wound on the iron cores 30 and 33, respectively, to form the magnetic flux generating mechanisms 32 and 35. The magnetic flux generating mechanisms 32 thus formed are arranged in the recess 28 in such a manner that the tip ends of the U-shaped iron cores 30 are set adjacent to the inner cylindrical surface of the roller 21. Similarly, the magnetic flux generating mechanisms 35 thus formed are arranged in the recess 29 in such a manner that the tip ends of the U-shaped iron cores 33 are set adjacent to the inner cylindrical surface of the roller 21. The lead wires connected to the induction coils 31 and 34 are extended through the long hole 43 and connected to an airtight conductor insertion terminal 44 provided at the end of the stationary shaft 23. That is, the lead wires are connected through the terminal 44 to external electric wires.

Figure 13:
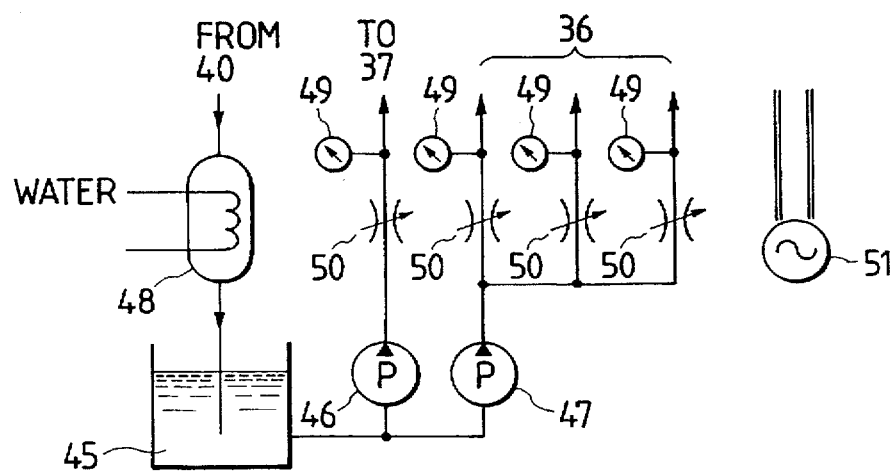
FIG. 13 is an explanatory diagram showing an example of an hydraulic and electrical circuit in the induction heating roller apparatus of the invention.

In the induction heating roller apparatus thus constructed, as shown in FIG. 13 pipes connected to an oil pressure pump 47 in an oil pressure circuit are connected to the long holes 36 of the stationary shaft 23, while a pipe coupled to an oil pressure pump 46 in the oil pressure circuit is connected to the long hole 37, so that oils having predetermined pressures are supplied to the long holes 36 and 37. The oil supplied to the long hole 37 is sent to the recesses 28 and 29, flown into the inlet of the long hole 40, and discharged through the long hole 40 while filling the space between the stationary shaft 23 and the roller 21, and then cooled by a heat exchanger 48 shown in FIG. 13 and returned into an oil tank 45. The oil thus returned is supplied to the long hole 37 by means of the oil pressure pump 46 and also to the long holes 36 by the oil pressure pump 47.

The oil circulation described above cools the stationary shaft 23 and the magnetic flux generating mechanisms 32 and 35, whereby large current can be applied to the induction coils, and the temperature of the surface of the roller can be increased, and the temperature follow-up characteristic with respect to the product high in thermal capacity can be increased. In FIG. 13, reference numeral 49 designates pressure gages, 50 defines adjust valves, and 51 indicates an AC power source.

An oil whose pressure is higher than the pressure in the space between the stationary shaft 23 and the roller 21 (which is filled up with the oil) is supplied through the long holes 36 to the cylinders 25 to push upwardly the pistons 26 to press the inner cylindrical surface of the roller 21, thereby to deform the roller 21 as much as the amount of deflection of the roller 21 which is generated by the load. In this operation, part of the oil is supplied through the through-holes 39 to the pushing portions 38, so that it flows through the small gaps between the pushing portions 39 and the roller 21 to press the inner cylindrical wall of the roller 21 upwardly, whereby the friction between the roller 21 and the pushing portions 38 is minimized.

When the oil pressures applied to the cylinders 25 is made lower than the pressure between the roller 21 and the stationary shaft 23, the oil between the roller 21 and the stationary shaft 23 is allowed to flow in the pushing portions, so that the pistons 26 are moved downwardly. That is, by individually (separately) controlling the oil pressure in the cylinders 25 which are arranged in a line in the direction of axis of the stationary shaft (by controlling every two cylinders in the embodiment), the deflection of the roller 21 can be accurately amended, whereby in the manufacture of the products, one and the same nipping force may be applied thereto.

Next, the AC power source 51 (for instance a six-phase AC power source whose currents are different by 60° in phase from one another) shown in FIG. 13 is connected to the induction coils 31 and 34 of the magnetic flux generating mechanisms 32 and 35, so that the AC currents of those phases are applied to the induction coils 31 and 34. When the AC currents flow in the induction coils 31 and 34, alternating magnetic flux outputs are produced in magnetic circuits which are made up of the iron cores 30 and 33 of the magnetic flux generating mechanisms 32 and 35 and the inner cylindrical wall of the roller 21, so that the inner cylindrical wall of the roller goes across the alternating magnetic flux outputs, to provide currents. The Joule heat of the currents thus provided heats the inner cylindrical wall of the roller 21.

In this case, the induction currents which are provided in the parts of the inner cylindrical wall of the roller 21 which confront with the spaces between the adjacent magnetic flux generating mechanisms are small in magnitude, and the temperature distribution of the roller 21 in the direction of axis has a waveform corresponding to the arrangement of the magnetic flux generating mechanisms 32 and 35. However, the spaces between the adjacent magnetic flux generating mechanisms are small in dimension. Therefore, the peak value thereof is small, and the temperature is averaged by the latent heat transfer of the two-phase (gas and liquid) heating media in the jacket chambers 22 formed in the cylindrical wall of the roller 21, whereby the temperature distribution of the surface of the roller in the direction of axis is made uniform. Hence, the variation in diameter of the roller, which is due to the temperature difference in the direction of axis, is eliminated, and the product which is nipped by the roller is heated uniformly.

Figure 6:
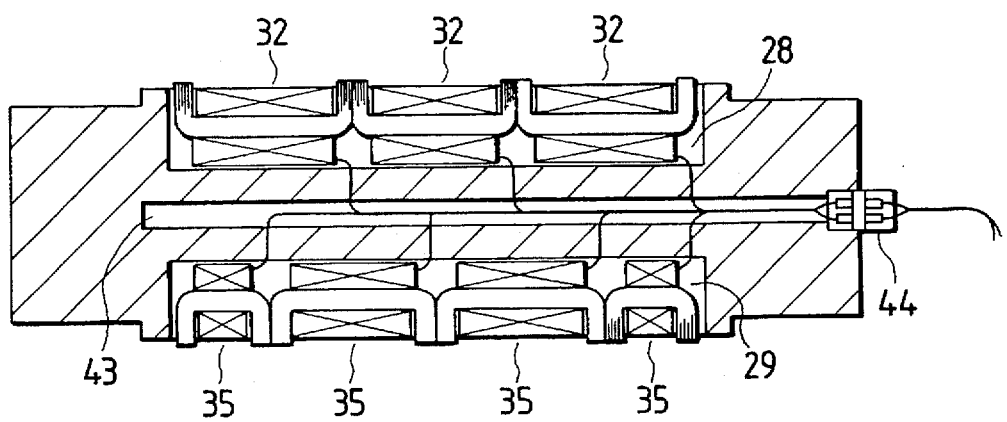
FIG. 6 is a longitudinal sectional view showing the arrangement of another example of the magnetic flux generating mechanisms of the induction heating roller apparatus shown in FIG. 3.

The arrangement of the magnetic flux generating mechanisms may be modified as shown in FIG. 6. That is, a plurality of magnetic flux generating mechanisms 32 arranged on both sides of the stationary shaft 23 and in the direction of axis are shifted as much as a half of the axial length of each magnetic flux generating mechanism; that is, they are arranged in a staggered manner on the surface of the stationary shaft, in such a manner that the waveform of the magnetic flux distribution of the magnetic flux generating mechanisms on one side of the stationary shaft 23 is canceled out by the waveform of the magnetic flux distribution of the magnetic flux generating mechanism on the other side of the stationary shaft 13. As a result, the effect of the variation in diameter of the roller which is caused by "thermal crown" between the adjacent magnetic flux generating mechanisms is substantially eliminated. Accordingly, the temperature distribution of the roller in the direction of axis is further improved.

That is, in the case of embodiment shown in FIG. 6, the magnetic flux generating mechanisms 32 and 35 are arranged in correspondence to a three-phase power source. Three magnetic flux generating mechanisms 32 are arranged on one side (upper side in FIG. 6) of the stationary shaft in the direction of axis, while four magnetic flux generating mechanisms 35 are arranged on the other side (lower side in FIG. 6) of the stationary shaft in the direction of axis; however, on this side, the dimension (length) of two magnetic flux generating mechanisms 35 arranged on both ends is made substantially to a half of the remaining two magnetic flux generating mechanisms 35. That is, the magnetic flux generating mechanism corresponding to one phase is divided into two parts. Thus, in the modification shown in FIG. 6, the spaces between the magnetic flux generating mechanisms arranged on one side of the stationary shaft in the direction of axis come substantially to the middles of the magnetic flux generating mechanisms arranged on the other side, respectively.

Figure 7:
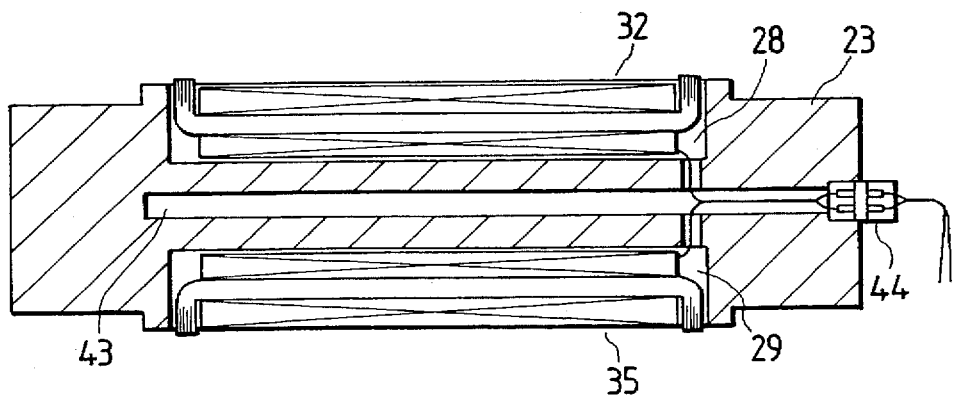
FIG. 7 is a longitudinal sectional view showing magnetic flux generating mechanism in another example of the induction heating roller apparatus according to the invention.
Figure 8:
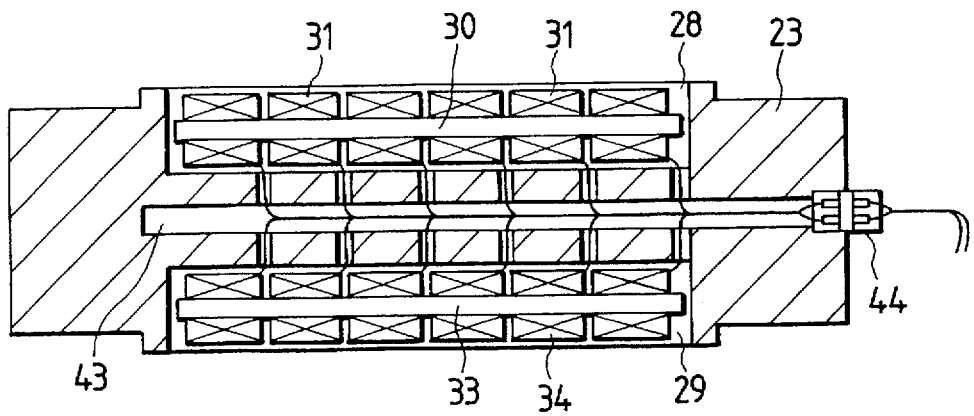
FIG. 8 is a longitudinal sectional view showing another example of the magnetic flux generating mechanisms of the induction heating roller apparatus according to the invention.

Furthermore, the arrangement of the magnetic flux generating mechanisms 32 and 35 may be modified as shown in FIG. 7. That is, two magnetic flux generating mechanisms 32 and 35 may be arranged on both sides of the stationary shaft 23, respectively. In the above-described embodiment, the iron cores of the magnetic flux generating mechanisms are U-shaped in section as shown in FIG. 9 or 10; however, the invention is not limited thereto or thereby. That is, the U-shaped iron cores may be replaced with two iron cores 30 and 33 which are straight iron cores as shown in FIG. 8. Those straight iron cores can be more readily formed than the U-shaped iron cores, and the former can be coupled to the straight shaft more readily than the latter. Furthermore, in FIG. 8, a plurality of induction coils 31 and a plurality of induction coils 34 are wounded on the two iron cores 30 and 33, respectively; however, it goes without saying that the plurality of induction coils 31 and the plurality of induction coils 34 may be replaced with two induction coils (31 and 34), respectively.

Figure 11:
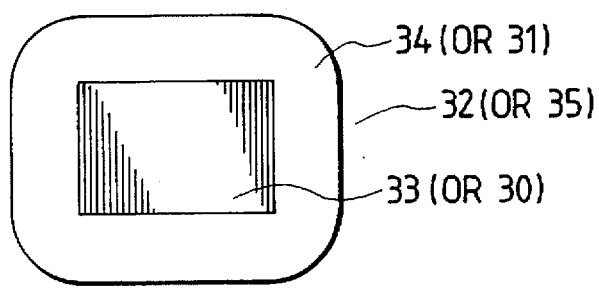
FIGS. 11 and 12 are cross sectional views showing examples of the magnetic flux generating mechanisms in the induction heating roller apparatus according to the invention.
Figure 12:
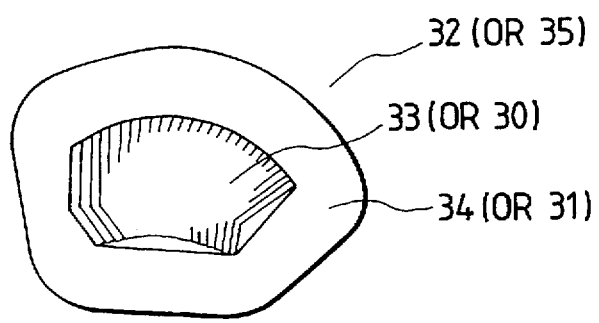

The sectional view of the above-described magnetic flux generating mechanisms is as shown in FIG. 11. However, the magnetic flux generating mechanisms may be replaced by ones which are formed by laminating iron core steel plates which are shaped like an involute curve.

In each of the above-described induction heating roller according to the invention, the hydraulic operating mechanism are arranged in one line in the stationary shaft in the direction of axis, and the first and second magnetic flux generating mechanisms are arranged in the stationary shafts on both sides in such a manner that each of the first and second magnetic flux generating mechanisms forms an angular interval of 90° with the hydraulic operation mechanisms arranged in one line. Hence, without lowering the geometrical moment of inertia in the direction of deflection of the stationary shaft which is due to the reaction of the hydraulic operating mechanisms, the amount of heat provided by the magnetic flux generating mechanisms is increased. In addition, by arranging the magnetic flux generating mechanisms at the positions where the amount of displacement due to the deflection of the stationary shaft is less, the electromagnetic coupling of the magnetic flux generating mechanisms to the roller is ensured in stability, thereby to increase the efficiency of thermal conversion. The aforementioned angular interval 90° is most suitable value; however, the invention is not limited thereto or thereby.

The number and the number of lines of the magnetic flux generating mechanisms, and the number of the hydraulic operating mechanisms arranged in one line are not always limited those which have been illustrated. In addition, the magnetic flux generating mechanisms may be further divided when arranged, to disperse the variation in diameter of the roll which is due to "thermal crown", thereby to partially control the temperature distribution of the roller in the direction of axis.

As was described above in detail, the induction heat generating roller of the invention has the following effects or merits: The configuration of the roller can be delicately and accurately changed according to the amount of deflection, and the temperature of the surface of the roller can be made uniform. The roller is large in thermal capacity.

What is claimed is:

1. An induction heating roller apparatus, comprising:

a stationary shaft including a plurality of hydraulic operating mechanisms disposed on a surface of the stationary shaft defining a first line extending in an axial direction of the stationary shaft and a plurality of magnetic flux generating mechanisms disposed on the surface of the stationary shaft defining second and third lines that extend in the axial direction of the stationary shaft such that the second and third lines are on opposite sides of the first line; and a roller rotatably supported on the stationary shaft, the roller having a substantially cylindrical inner wall and defining at least one jacket chamber filled with a two-phase heating medium, wherein each one of the plurality of hydraulic operating mechanisms presses the cylindrical inner wall of the roller, and wherein each one of the plurality of magnetic flux generating mechanisms has an iron core and induction coils wound on the iron core, the roller being heated according to a current applied to the induction coils of the magnetic flux generating mechanisms.

2. The induction heating roller apparatus according to claim 1, wherein the stationary shaft further includes means for supplying cooling oil to the plurality of magnetic flux generating mechanisms.

3. An induction heating roller apparatus according to claim 1, wherein the magnetic flux generating mechanisms of the second line are shifted in the axial direction with respect to the magnetic flux generating mechanisms of the third line such that centers of the magnetic flux generating mechanisms are offset in the axial direction with respect to each other.

4. The induction heating roller apparatus according to claim 1, wherein some of the iron cores of the magnetic flux generating mechanisms include a linear iron core.

5. The induction heating roller apparatus according to claim 1, wherein each of the iron cores of the magnetic flux generating mechanisms is formed by laminating U-shaped magnetic steel plates each having a curved portion and straight portions.

6. The induction heating roller apparatus according to claim 1, wherein the second and third lines are 90° away from the first line with respect to a center of the stationary shaft.

7. The induction heating roller apparatus according to claim 1, wherein the first line is defined at a top portion of the stationary roller.

8. The induction heating roller apparatus according to claim 1, wherein all of the hydraulic operating mechanisms are formed along the first line.

9. The induction heating roller apparatus according to claim 1, wherein each one of the plurality of hydraulic operating mechanisms has a piston, each piston pressing the cylindrical inner wall of the roller according to a hydraulic pressure of a pressing oil supplied to the piston.

10. The induction heating roller apparatus according to claim 1, wherein the plurality of hydraulic operating mechanisms compensate for a deflection of the roller.

11. An induction heating roller apparatus, comprising:

a stationary shaft including a plurality of hydraulic operating mechanisms disposed on a surface of the stationary shaft at a top portion thereof and a plurality of magnetic flux generating mechanisms disposed on the surface of the stationary shaft away from the top portion; and a roller rotatably supported on the stationary shaft, the roller having a substantially cylindrical inner wall, wherein the plurality of hydraulic operating mechanisms define a first line and the magnetic flux generating mechanisms define second and third lines, each one of the first, second and third lines extending in an axial direction of the stationary shaft with the second and third lines being 90° away from the first line with respect to a center of the stationary shaft, wherein each one of the plurality of hydraulic operating mechanisms presses the cylindrical inner wall of the roller, and wherein each one of the plurality of magnetic flux generating mechanisms has an iron core and induction coils wound on the iron cores, the roller being heated according to a current applied to the induction coils of the magnetic flux generating mechanisms.

12. The induction heating roller apparatus according to claim 11, wherein the second and third lines are on opposite sides of the first line.

13. An induction heating roller apparatus according to claim 11, wherein the magnetic flux generating mechanisms of the second line are shifted in the axial direction with respect to the magnetic flux generating mechanisms of the third line such that centers of the magnetic flux generating mechanisms are offset in the axial direction with respect to each other.

14. The induction heating roller apparatus according to claim 11, wherein the plurality of magnetic flux generating mechanisms are disposed on side portions of the surface of the stationary shaft.

15. The induction heating roller apparatus according to claim 11, wherein each one of the plurality of hydraulic operating mechanisms has a piston, each piston pressing the cylindrical inner wall of the roller according to a hydraulic pressure of a pressing oil supplied to the piston.

16. The induction heating roller apparatus according to claim 11, wherein the plurality of hydraulic operating mechanisms compensate for a deflection of the roller.

* * * * *